United States Patent
Murahashi et al.

(10) Patent No.: US 12,286,136 B2
(45) Date of Patent: Apr. 29, 2025

(54) PROCEED-OR-STOP DETERMINATION APPARATUS

(71) Applicant: Honda Motor Co., Ltd., Tokyo (JP)

(72) Inventors: Yoshimitsu Murahashi, Wako (JP); Yohei Kitahara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 383 days.

(21) Appl. No.: 17/891,240

(22) Filed: Aug. 19, 2022

(65) Prior Publication Data
US 2023/0054661 A1   Feb. 23, 2023

(30) Foreign Application Priority Data
Aug. 23, 2021   (JP) .................................. 2021-135679

(51) Int. Cl.
*B60W 60/00*   (2020.01)
*B60W 30/18*   (2012.01)
(Continued)

(52) U.S. Cl.
CPC .. *B60W 60/0015* (2020.02); *B60W 30/18154* (2013.01); *B60W 40/04* (2013.01);
(Continued)

(58) Field of Classification Search
CPC ....... B60W 2420/403; B60W 2520/10; B60W 2554/802; B60W 2555/60;
(Continued)

(56) References Cited

U.S. PATENT DOCUMENTS

2013/0297124 A1* 11/2013 Be ........................... G06F 17/00
701/1
2016/0257288 A1* 9/2016 Miller ............. B60W 30/18109
(Continued)

FOREIGN PATENT DOCUMENTS

CN   103886759 A * 6/2014
CN   106997676 A * 8/2017
(Continued)

OTHER PUBLICATIONS

Japanese office action; Application 2021135679; Feb. 21, 2023.
Chinese Office action; Application 202210975624.x; 17 pages; Jan. 15, 2025.

*Primary Examiner* — Babar Sarwar
(74) *Attorney, Agent, or Firm* — Duft & Bornsen, PC

(57) ABSTRACT

Proceed-or-stop determination apparatus, includes: camera mounted on self-driving vehicle and configured to acquire image in traveling direction of the vehicle; speed acquisition unit configured to acquire traveling speed of the vehicle; position acquisition unit configured to acquire position of the vehicle with respect to stop position corresponding to traffic light in the traveling direction; and controller. The controller is configured to perform: recognizing the traffic light at predetermined cycle based on the image; recognizing lighting state of the traffic light; and determining whether the vehicle should proceed or stop at the predetermined cycle based on the lighting state, traveling speed, and position, when the traffic light is recognized. The controller determines whether the vehicle should proceed or stop further based on previous determination result in previous cycle and the lighting state recognized in the previous cycle.

3 Claims, 5 Drawing Sheets

(51) Int. Cl.
  *B60W 40/04* (2006.01)
  *B60W 40/105* (2012.01)
  *G06V 10/56* (2022.01)
  *G06V 20/58* (2022.01)
(52) U.S. Cl.
  CPC ........... *B60W 40/105* (2013.01); *G06V 10/56* (2022.01); *G06V 20/584* (2022.01); *B60W 2420/403* (2013.01); *B60W 2555/60* (2020.02)
(58) Field of Classification Search
  CPC .......... B60W 30/18154; B60W 40/04; B60W 40/105; B60W 60/0011; B60W 60/0015; G06V 10/56; G06V 20/584
  See application file for complete search history.

(56) References Cited

U.S. PATENT DOCUMENTS

| | | | | |
|---|---|---|---|---|
| 2016/0288789 | A1* | 10/2016 | Durgin | B60W 30/143 |
| 2016/0318490 | A1* | 11/2016 | Ben Shalom | B60T 7/22 |
| 2021/0056840 | A1* | 2/2021 | Yamazaki | G08G 1/095 |
| 2021/0146803 | A1* | 5/2021 | Wu | B60W 50/0097 |
| 2021/0300367 | A1* | 9/2021 | Yamashita | G06V 20/584 |
| 2022/0306111 | A1* | 9/2022 | Kuroki | B60W 30/143 |
| 2023/0109372 | A1* | 4/2023 | Ota | B60W 30/181 |
| | | | | 701/70 |

FOREIGN PATENT DOCUMENTS

| | | | | |
|---|---|---|---|---|
| CN | 110827552 A | | 2/2020 | |
| CN | 112861748 A | * | 5/2021 | ......... G06K 9/00825 |
| CN | 113160590 A | | 7/2021 | |
| EP | 2746803 A1 | * | 6/2014 | ............ G01S 13/42 |
| EP | 4086874 A1 | | 11/2022 | |
| JP | 2006139707 A | | 6/2006 | |
| JP | 2011170539 A | | 9/2011 | |
| JP | 2012238169 A | * | 12/2012 | |
| JP | 2020067703 A | | 4/2020 | |
| WO | WO-2021094801 A1 | * | 5/2021 | ...... B60W 30/18154 |
| WO | WO-2021153051 A1 | * | 8/2021 | ............ B60W 10/18 |

* cited by examiner

FIG. 5

| LIGHTING STATE (n-1) | | G (Green) | | | | Y (Yellow) | | | | | R (Red) | | | | | U (Unknown) | | | |
|---|---|---|---|---|---|---|---|---|---|---|---|---|---|---|---|---|---|---|---|
| LIGHTING STATE (n) | | G | Y | (R) | U | (G) | Y | R | U | | G | (Y) | R | U | | G | Y | R | U |
| PROCEED-OR-STOP DETERMINATION RESULT (n-1) = Go | A | Go | Go | - | Go | - | Go | Go | Go | | Go | - | Go | Go | | Go | Go | Go | Go |
| | B | Go | Stop | - | Stop | - | - | - | - | | Go | - | - | - | | Go | Go | Stop | Stop |
| | C | Go | Go | - | Go | - | Go | - | - | | Go | - | - | - | | Go | Go | Stop | Stop |
| | D | Go | Go | - | Go | - | Go | - | - | | Go | - | - | - | | Go | Go | Stop | Stop |
| | E | Go | Stop | - | Stop | - | - | - | - | | Go | - | - | - | | Go | Go | Stop | Stop |
| PROCEED-OR-STOP DETERMINATION RESULT (n-1) = Stop | A | Go | - | - | - | - | - | - | - | | Go | - | - | - | | Go | Stop | Stop | Stop |
| | B | Go | - | - | - | - | Stop | Stop | Stop | | Go | - | Stop | Stop | | Go | Stop | Stop | Stop |
| | C | Go | - | - | - | - | - | - | - | | Go | - | - | - | | Go | Stop | Stop | Stop |
| | D | Go | - | - | - | - | - | - | - | | Go | - | - | - | | Go | Stop | Stop | Stop |
| | E | Go | - | - | - | - | Stop | Stop | Stop | | Go | - | Stop | Stop | | Go | Stop | Stop | Stop |

PROCEED-OR-STOP DETERMINATION APPARATUS

CROSS-REFERENCE TO RELATED APPLICATION

This application is based upon and claims the benefit of priority from Japanese Patent Application No. 2021-135679 filed on Aug. 23, 2021, the content of which is incorporated herein by reference.

BACKGROUND OF THE INVENTION

Field of the Invention

This invention relates to a proceed-or-stop determination apparatus configured to determine whether a self-driving vehicle should proceed or stop.

Description of the Related Art

Conventionally, as this type of apparatus, an apparatus has been known that identify a lighting state of traffic light to determine a direction in which a vehicle is allowed to proceed (for example, Japanese Unexamined Patent Publication No. 2020-067703 (JP2020-067703A)). In the apparatus described in JP2020-067703A, when the lighting state of traffic light cannot be identified based on a current image of the traffic light on an intersection in the traveling direction of the vehicle, the lighting state of traffic light is estimated based on a previous image acquired before the imaging time point of the current image, the direction in which the vehicle is allowed to proceed in the intersection is determined based on the estimation result, and travel control of the vehicle is performed based on the determination result.

By spreading self-driving vehicles that can travel on the general road provided with traffic lights, the safety and convenience of the entire transportation society can be improved, and a sustainable transportation system can be realized. Improved transportation efficiency and smoothness can reduce $CO_2$ emissions and reduce environmental burdens.

However, as the apparatus described in JP2020-067703A, simply estimating the lighting state of traffic light may not be able to stably determine whether the vehicle should proceed or stop, and it may be difficult to perform appropriate travel control of the vehicle.

SUMMARY OF THE INVENTION

An aspect of the present invention is a proceed-or-stop determination apparatus, including: a camera mounted on a self-driving vehicle and configured to acquire an image in a traveling direction of the self-driving vehicle; a speed acquisition unit configured to acquire a traveling speed of the self-driving vehicle; a position acquisition unit configured to acquire a position of the self-driving vehicle with respect to a stop position corresponding to a traffic light in the traveling direction; and a controller including a processor and a memory coupled to the processor. The controller is configured to perform: recognizing the traffic light at a predetermined cycle based on the image acquired by the camera; recognizing a lighting state of the traffic light recognized; and determining whether the self-driving vehicle should proceed or stop at the predetermined cycle based on the lighting state recognized, the traveling speed acquired by the speed acquisition unit, and the position acquired by the position acquisition unit, when the traffic light is recognized. The controller determines whether the self-driving vehicle should proceed or stop further based on a previous determination result in a previous cycle and the lighting state recognized in the previous cycle.

BRIEF DESCRIPTION OF THE DRAWINGS

The objects, features, and advantages of the present invention will become clearer from the following description of embodiments in relation to the attached drawings, in which:

FIG. 5 is a table for explaining proceed-or-stop determination results by a determination unit of FIG. 3.

DETAILED DESCRIPTION OF THE INVENTION

An embodiment of the present invention is explained with reference to FIGS. 1A to 5 in the following. A proceed-or-stop determination apparatus according to the embodiment of the present invention is applied to a self-driving vehicle including a travel control unit for controlling travel actuators so that the vehicle autonomously travels. The proceed-or-stop determination apparatus performs proceed-or-stop determination of the self-driving vehicle on the general road provided with traffic lights.

Figure 1A:
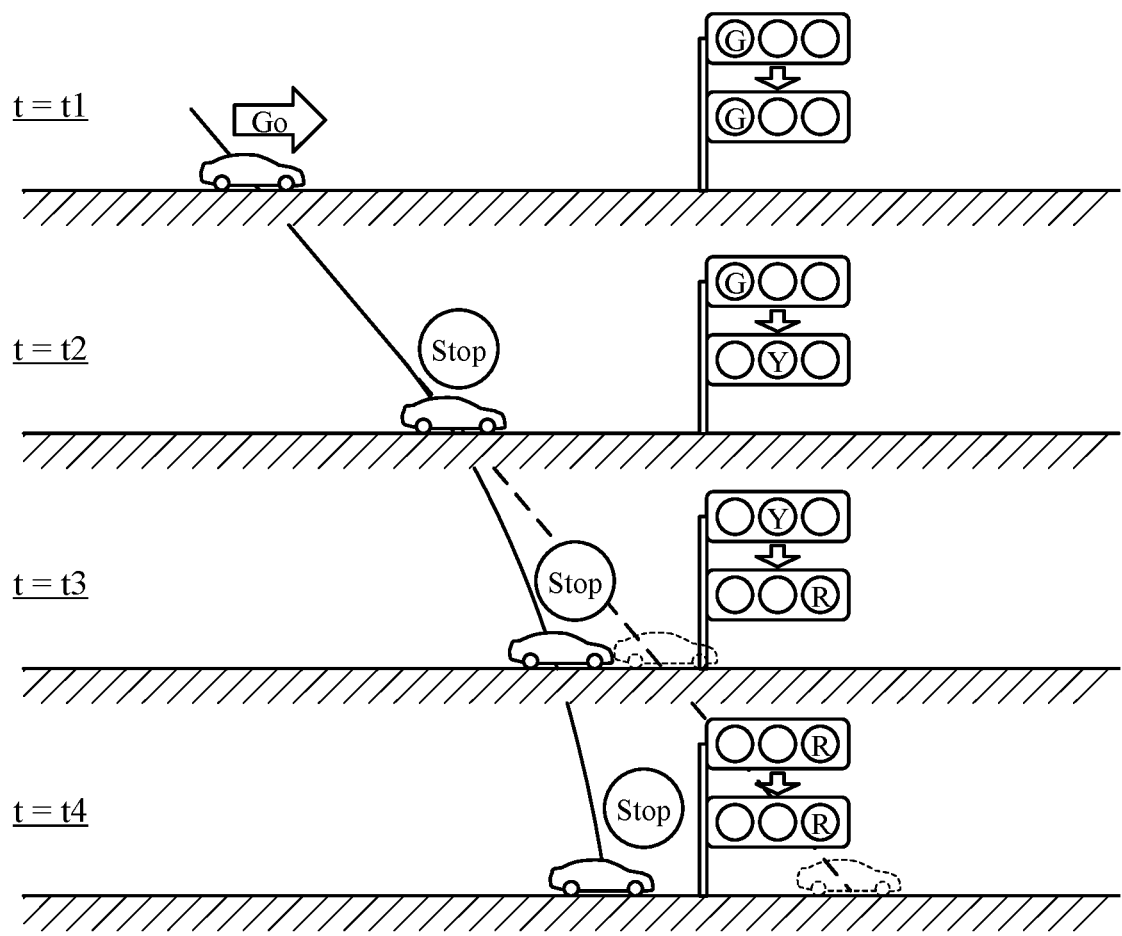
FIG. 1A is a diagram for explaining cases where vehicles should stop.
Figure 1B:
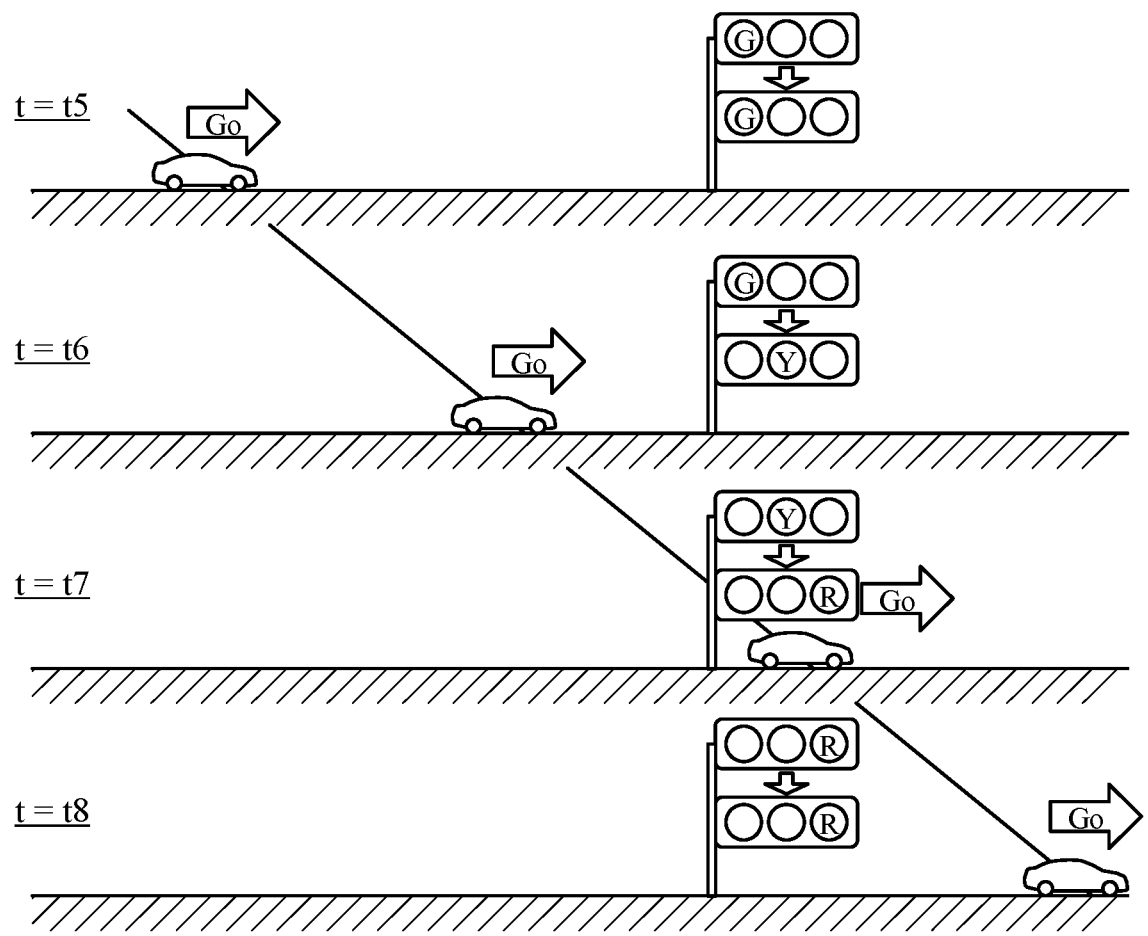
FIG. 1B is a diagram for explaining cases where vehicles should proceed.

FIGS. 1A and 1B are diagrams for explaining cases where vehicles should stop and cases where vehicles should proceed (go). As shown in FIGS. 1A and 1B, when the lighting state of a traffic light in front of a vehicle is a green signal state G where vehicles are allowed to proceed, the vehicle (driver of the vehicle) can proceed in accordance with the traffic conditions around the vehicle (time point t1, t5). When the lighting state of the traffic light is a red signal state R where vehicles are prohibited from proceeding, the vehicle (driver of the vehicle) has to stop at a stop position (stop line) corresponding to the traffic light except where the vehicle has passed through the stop position (time point t3 to t4, t7 to t8).

On the other hand, when the lighting state of the traffic light is a yellow signal state Y where vehicles are prohibited from proceeding and passing through the stop position except where the vehicle cannot stop safely, the vehicle (driver of the vehicle) has to determine whether to stop at the stop position or to proceed in accordance with vehicle position with respect to the stop position and traveling speed at the current time point.

Figure 2:
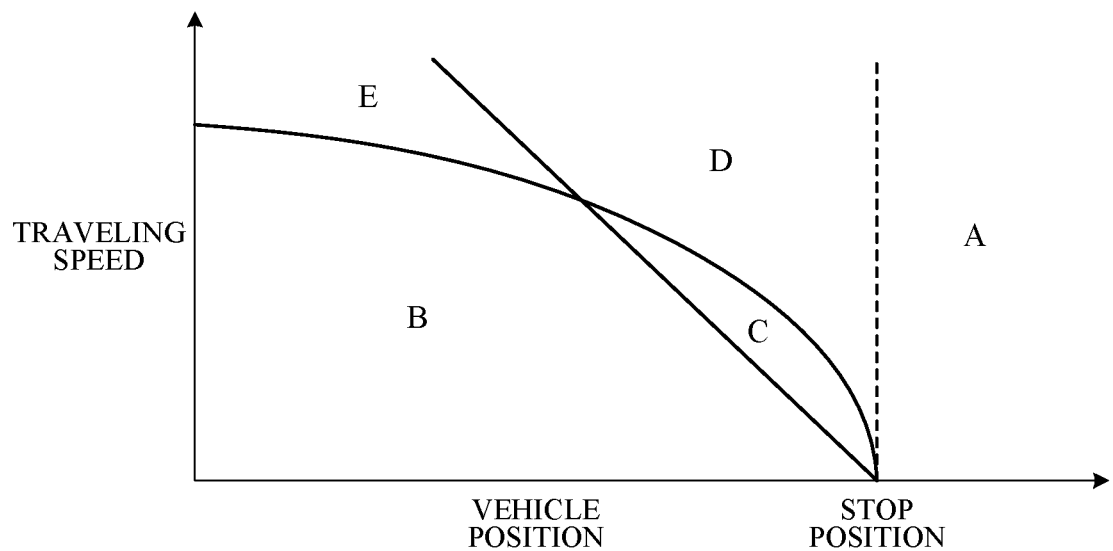
FIG. 2 is a diagram for explaining vehicle position and traveling speed around a traffic light.

FIG. 2 is a diagram for explaining vehicle position and traveling speed around the traffic light. In FIG. 2, a condition A corresponds to a condition where the vehicle has already passed through the stop position, and conditions B to E correspond to conditions where the vehicle still travels before the stop position. Conditions B and C correspond to conditions where it is possible for the vehicle to be decelerated to stop at the stop position safely. Conditions D and E correspond to conditions where it is difficult for the vehicle to be decelerated to stop at the stop position safely. Conditions C and D correspond to conditions where the vehicle passes through the stop position before the lighting state has changed to the red signal state R when keeping the current traveling speed. Conditions B and E correspond to conditions where the vehicle passes through the stop position after the lighting state has changed to the red signal state R when keeping the current traveling speed.

For example, as shown in FIG. 1A, if the vehicle position and the traveling speed at the time point t2 where the lighting state has changed to the yellow signal state Y corresponds to the condition B, the vehicle passes through the stop position after the lighting state has changed to the red signal state R at the time point t3 when keeping the current traveling speed. In such case, at the time point t2, it can be determined that the vehicle should stop at the stop position.

On the other hand, as shown in FIG. 1B, if the vehicle position and the traveling speed at the time point t6 where the lighting state has changed to the yellow signal state Y corresponds to the condition D, the vehicle passes through the stop position before the lighting state has changed to the red signal state R at the time point t7 when keeping the current traveling speed. In such case, at the time point t6, it can be determined that the vehicle should proceed without stopping at the stop position.

In self-driving vehicles, since the travel actuators are controlled by the travel control unit based on the proceed-or-stop determination results and the traffic conditions around the vehicle, the proceed-or-stop determination has to be performed stably. Further, the proceed-or-stop determination, which is performed at a predetermined cycle in accordance with, for example, the imaging cycle of the camera for detecting the lighting state, has to be performed stably even when the lighting state (signal color) is not recognized temporarily due to shielding object, weather, or the like. Therefore, in the present embodiment, the proceed-or-stop determination apparatus is configured as follows so that proceed-or-stop determination as to whether the self-driving vehicle should proceed or stop can be performed stably.

Figure 3:
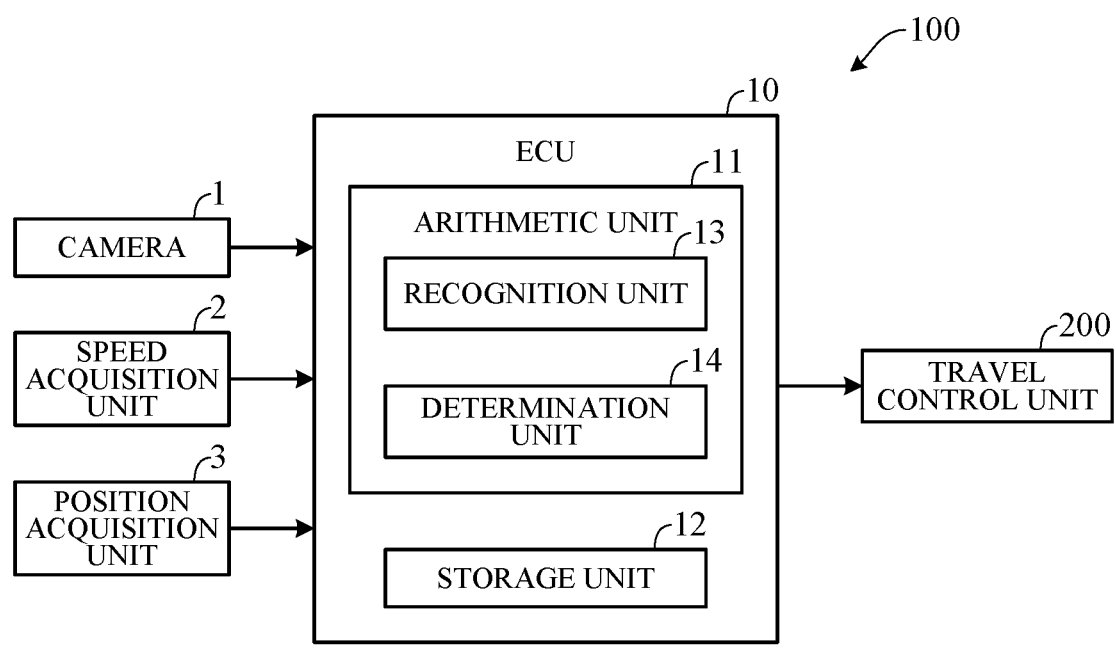
FIG. 3 is a block diagram schematically showing an example of main configuration of a proceed-or-stop determination apparatus according to an embodiment of the present invention.

FIG. 3 is a block diagram schematically showing an example of main configuration of a proceed-or-stop determination apparatus (apparatus) 100 according to the embodiment of the present invention. As shown in FIG. 3, the apparatus 100 is mainly includes an electronic control unit (ECU) 10. The ECU 10 includes a computer including an arithmetic unit 11 such as a CPU (processor), a storage unit 12 such as a ROM, RAM (memory), and other peripheral circuits.

The ECU 10 is configured for example, as a part of ECU groups mounted on the self-driving vehicle and controlling operation of the self-driving vehicle. The ECU 10 may include a computer provided outside the self-driving vehicle. The ECU 10 may include a computer mounted on the self-driving vehicle and a computer provided outside the self-driving vehicle. The ECU 10 is connected with a camera 1 mounted on the self-driving vehicle, a speed acquisition unit 2, a position acquisition unit 3, and a travel control unit 200.

The camera 1 includes image sensors such as CCD or CMOS. The camera 1 is provided so as to capture overall image in the traveling direction including the traffic light provided on the road on which the self-driving vehicle travels. The camera 1 acquires image in the traveling direction at a predetermined cycle. The speed acquisition unit 2 includes a wheel speed sensor, for example. The speed acquisition unit 2 acquires the traveling speed of the self-driving vehicle. The position acquisition unit 3 includes a positioning sensor that receives positioning signals transmitted from the positioning satellite, for example. The position acquisition unit 3 measures or calculates a current position of the self-driving vehicle to acquire a relative position (vehicle position) of the self-driving vehicle with respect to each stop position corresponding to each traffic light.

The arithmetic unit 11 of the ECU 10 includes, as a functional configuration, a recognition unit 13 and a determination unit 14. Specifically, the arithmetic unit 11 of the ECU 10 functions as the recognition unit 13 and the determination unit 14. The storage unit 12 stores information such as various control programs, threshold values used in the programs, and the like.

Figure 4:
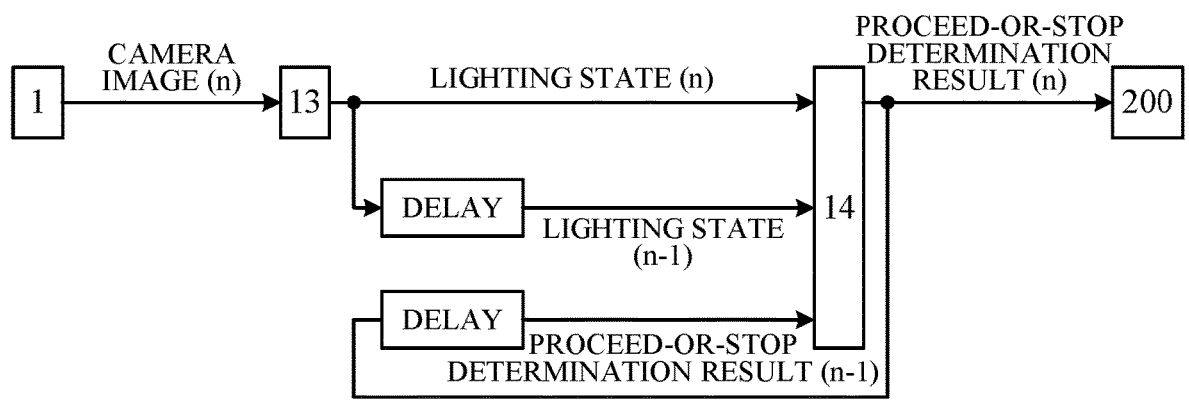
FIG. 4 is a diagram for explaining processing performed by the proceed-or-stop determination apparatus according to the embodiment of the present invention.

FIG. 4 is a diagram for explaining processing performed by the arithmetic unit 11, showing flow of processing performed by the recognition unit 13 and the determination unit 14. As shown in FIG. 4, the recognition unit 13 recognizes the traffic light in the traveling direction of the self-driving vehicle at the predetermined cycle based on the image from the camera 1, and recognizes the lighting state of the recognized traffic light. Specifically, the recognition unit 13 recognizes the lighting state of the traffic light as one of the green signal state G, the yellow signal state Y, the red signal state R, and an unknown state U where the lighting state is unknown (it is unknown which of the three states (the green signal state G, the yellow signal state Y, and the red signal state R) the lighting state is.

The determination unit 14 performs the current proceed-or-stop determination based on the recognized lighting state, the traveling speed acquired by the speed acquisition unit 2, the vehicle position acquired by the position acquisition unit 3, and the previous proceed-or-stop determination result, when the traffic light is recognized by the recognition unit 13. Specifically, the determination unit 14 performs the current proceed-or-stop determination based on the current and previous lighting state of the traffic light, the conditions A to E (FIG. 2) corresponding to the traveling speed and the vehicle position, and the previous proceed-or-stop determination results. When the proceed-or-stop determination is performed by the determination unit 14, the travel actuators are controlled by the travel control unit based on the proceed-or-stop determination result and the traffic conditions around the self-driving vehicle.

FIG. 5 is a table for explaining proceed-or-stop determination results by the determination unit 14. As shown in FIG. 5, when the green signal state G is recognized by the recognition unit 13, the current proceed-or-stop determination result becomes "GO" (proceed), regardless of the previous lighting state of the traffic light, the conditions A to E corresponding to the traveling speed and the vehicle position, and the previous proceed-or-stop determination result.

When the green signal state G had been recognized by the recognition unit 13 and "GO" had been determined by the determination unit 14 in the previous cycle and the yellow signal state Y or the unknown state U has been recognized in the current cycle, the current proceed-or-stop determination result becomes "GO" in the conditions A, C, and D and "STOP" in the conditions B and E.

In the conditions A, C, and D, when the yellow signal state Y had been recognized by the recognition unit 13 and "GO" had been determined by the determination unit 14 in the previous cycle and the yellow signal state Y has been recognized in the current cycle, the current proceed-or-stop determination result becomes "GO". In the conditions B and E, when the yellow signal state Y had been recognized by the recognition unit 13 and "STOP" had been determined by the determination unit 14 in the previous cycle and the yellow signal state Y has been recognized in the current cycle, the current proceed-or-stop determination result becomes "STOP".

In the condition A, when the yellow signal state Y, the red signal state R, or the unknown state U had been recognized by the recognition unit 13 and "GO" had been determined by the determination unit 14 in the previous cycle and the red signal state R or the unknown state U has been recognized in the current cycle, the current proceed-or-stop determination result becomes "GO". In the conditions B and E, when the yellow signal state Y, the red signal state R, or the unknown state U had been recognized by the recognition unit 13 and "STOP" had been determined by the determination unit 14 in the previous cycle and the red signal state R or the unknown state U has been recognized in the current cycle, the current proceed-or-stop determination result becomes "STOP".

On the other hand, when the unknown state U had been recognized by the recognition unit 13 in the previous cycle and the yellow signal state Y or the unknown state U has been recognized by the recognition unit 13 in the current cycle, the previous proceed-or-stop determination result becomes the current proceed-or-stop determination result, as it is, regardless of the conditions A to E. If the lighting state had not been recognized in the previous cycle and the yellow signal state Y has been recognized in the current cycle, depending on the conditions such as the traveling speed, the proceed-or-stop determination result may vary alternately and the travel control based on the proceed-or-stop determination result may become unstable, for example, unnecessary deceleration may occur. In such case, by maintaining the previous proceed-or-stop determination result, it becomes possible to ensure stable proceed-or-stop determination and reliably suppress unnecessary deceleration in the travel control.

The present embodiment can achieve advantages and effects such as the following:

(1) The apparatus 100 includes: the camera 1 mounted on the self-driving vehicle and configured to acquire the image in the traveling direction of the self-driving vehicle; the recognition unit 13 configured to recognize the traffic light in the traveling direction of the self-driving vehicle at the predetermined cycle based on the image acquired by the camera 1 and to recognize the lighting state of the recognized traffic light; the speed acquisition unit 2 configured to acquire the traveling speed of the self-driving vehicle; the position acquisition unit 3 configured to acquire the position of the self-driving vehicle with respect to the stop position corresponding to the traffic light recognized by the recognition unit 13; and the determination unit 14 configured to determine whether the self-driving vehicle should proceed or stop at the predetermined cycle based on the lighting state recognized by the recognition unit 13, the traveling speed acquired by the speed acquisition unit 2, and the position acquired by the position acquisition unit 3, when the traffic light is recognized by the recognition unit 13 (FIG. 3).

The determination unit 14 determines whether the self-driving vehicle should proceed or stop further based on the previous determination result and the lighting state recognized by the recognition unit 13 in the previous cycle (FIG. 5). By performing the current proceed-or-stop determination in consideration of the previous determination result and the lighting state of the traffic light, it becomes possible to perform the proceed-or-stop determination appropriately and stably and perform the travel control of the self-driving vehicle based on the proceed-or-stop determination result appropriately.

(2) The recognition unit 13 recognizes the lighting state as one of: the green signal state G where the self-driving vehicle is allowed to proceed; the yellow signal state Y where the self-driving vehicle is prohibited from proceeding and passing through the stop position except where the self-driving vehicle cannot stop safely; the red signal state R where the self-driving vehicle is prohibited from proceeding; and the unknown state U where the lighting state is unknown (FIG. 5). The determination unit 14 determines that the self-driving vehicle should proceed when the green signal state G is recognized by the recognition unit 13; determines that the self-driving vehicle should stop at the stop position except where the self-driving vehicle cannot stop safely when the yellow signal state Y is recognized by the recognition unit 13; determines that the self-driving vehicle should stop at the stop position except where the self-driving vehicle has passed through the stop position when the red signal state R is recognized by the recognition unit 13 (FIG. 5). By recognizing the lighting state and performing the proceed-or-stop determination based on the recognized lighting state, it becomes possible to appropriately perform the travel control of the self-driving vehicle even on the general road provided with traffic lights.

(3) The determination unit 14 determines whether the self-driving vehicle should proceed or stop based on the previous determination result regardless of the traveling speed and the position when the lighting state recognized by the recognition unit 13 in the previous cycle is the unknown state U and the lighting state recognized by the recognition unit 13 in a current cycle is the yellow signal state Y (FIG. 5). When the lighting state (signal color) had not been recognized in the previous cycle and the yellow signal state Y has been recognized in the current cycle, by maintaining the previous proceed-or-stop determination result regardless of the vehicle position or the travel speed of the self-driving vehicle, it becomes possible to ensure stable proceed-or-stop determination and reliably suppress unnecessary deceleration in the travel control.

In the above-described embodiment, an example has been exemplified in FIG. 4 etc., where the processing of the recognition unit 13 and the determination unit 14 are performed at the predetermined cycle in accordance with the imaging cycle of the camera 1. However, a controller configured to perform: recognizing the traffic light at a predetermined cycle; recognizing a lighting state of the traffic light recognized; and determining whether the self-driving vehicle should proceed or stop, is not limited to the one described above. For example, the processing may be performed at the arithmetic cycle of the ECU. The processing period may be changed, for example, in accordance with the vehicle position or the raveling speed.

In the above-described embodiment, an example has been exemplified where the speed acquisition unit 2 includes the wheel speed sensor and the position acquisition unit 3 includes the positioning sensor. However, a speed acquisition unit configured to acquire a traveling speed of the self-driving vehicle and a position acquisition unit configured to acquire a position of the self-driving vehicle are not limited to the ones described above. For example, the vehicle position may be acquired by autonomous navigation, and the traveling speed may be acquired based on the vehicle positions.

The above embodiment can be combined as desired with one or more of the aforesaid modifications. The modifications can also be combined with one another.

According to the present invention, it becomes possible to stably determine whether the self-driving vehicle should proceed or stop.

Above, while the present invention has been described with reference to the preferred embodiments thereof, it will be understood, by those skilled in the art, that various changes and modifications may be made thereto without departing from the scope of the appended claims.

The invention claimed is:

1. A proceed-or-stop determination apparatus, comprising:
   a camera mounted on a self-driving vehicle and configured to acquire an image in a traveling direction of the self-driving vehicle;
   a speed acquisition unit configured to acquire a traveling speed of the self-driving vehicle;
   a position acquisition unit configured to acquire a position of the self-driving vehicle with respect to a stop position corresponding to a traffic light in the traveling direction; and
   a controller including a processor and a memory coupled to the processor, wherein the controller is configured to perform:
      recognizing the traffic light at a predetermined cycle based on the image acquired by the camera;
      recognizing a lighting state of the traffic light recognized as one of a first lighting state where the self-driving vehicle is allowed to proceed, a second lighting state where the self-driving vehicle is prohibited from proceeding and passing through the stop position except where the self-driving vehicle cannot stop safely, a third lighting state where the self-driving vehicle is prohibited from proceeding, and an unknown state where the lighting state is unknown;
      determining whether the self-driving vehicle should proceed or stop at the predetermined cycle based on the lighting state recognized, the traveling speed acquired by the speed acquisition unit, and the position acquired by the position acquisition unit, when the traffic light is recognized; and
      controlling travel actuators of the self-driving vehicle based on determination results of whether the self-driving vehicle should proceed or stop, wherein
   the controller determines whether the self-driving vehicle should proceed or stop further based on a previous determination result in a previous cycle and the lighting state recognized in the previous cycle, wherein
   when the lighting state recognized in the previous cycle is the first lighting state or the second lighting state and the lighting state recognized in a current cycle is the second lighting state, the controller determines that the self-driving vehicle should proceed on condition that the self-driving vehicle has already passed through the stop position, or on condition that the self-driving vehicle passes through the stop position before the lighting state changes to the third lighting state when keeping the traveling speed, while determining that the self-driving vehicle should stop on condition that the self-driving vehicle passes through the stop position after the lighting state changes to the third lighting state when keeping the traveling speed, wherein
   when the lighting state recognized in the previous cycle is the unknown state and the lighting state recognized in the current cycle is the second lighting state, the controller maintains the previous determination result as a current determination result regardless of the traveling speed acquired by the speed acquisition unit or the position acquired by the position acquisition unit.

2. The proceed-or-stop determination apparatus according to claim 1, wherein
   the controller:
      determines that the self-driving vehicle should proceed when the first lighting state is recognized; and
      determines that the self-driving vehicle should stop at the stop position except where the self-driving vehicle has passed through the stop position when the third lighting state is recognized.

3. The proceed-or-stop determination apparatus according to claim 1, wherein
   the controller recognizes the traffic light and the lighting state at the predetermined cycle in accordance with an imaging cycle of the camera.

* * * * *